Figure 1A:
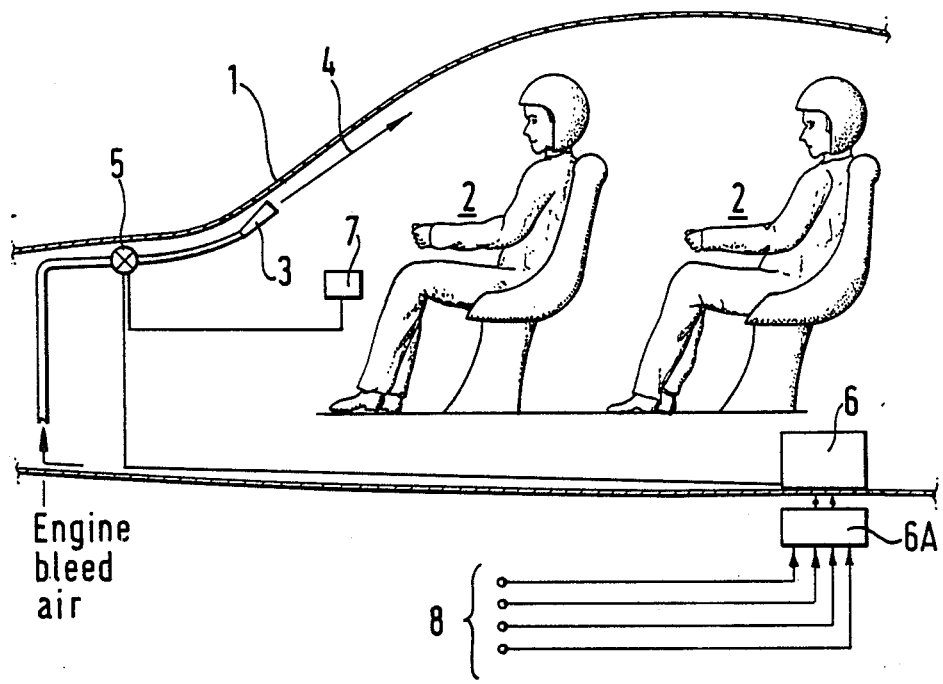

United States Patent [19]

Harvey

[11] Patent Number: 4,693,172

[45] Date of Patent: Sep. 15, 1987

[54] AUTOMATIC MIST PREVENTING SYSTEM FOR VEHICLE TRANSPARENCIES

[75] Inventor: Charles P. Harvey, Brough, England

[73] Assignee: British Aerospace PLC, London, England

[21] Appl. No.: 807,473

[22] Filed: Dec. 10, 1985

[30] Foreign Application Priority Data

Dec. 10, 1984 [GB] United Kingdom ............... 8431084

[51] Int. Cl.$^4$ .............................................. B60S 1/54
[52] U.S. Cl. ..................................... 98/2.01; 98/2.09; 219/203
[58] Field of Search ............... 98/2.01, 2.09; 219/203; 165/17

[56] References Cited

U.S. PATENT DOCUMENTS

| 3,696,360 | 10/1972 | Gajewski ...................... 219/203 X |
| 3,902,040 | 8/1975 | Ikeda et al. ..................... 219/203 |
| 3,934,111 | 1/1975 | Roselli et al. .................... 219/203 |
| 4,412,424 | 11/1983 | Lida et al. ....................... 98/2.09 X |

FOREIGN PATENT DOCUMENTS 4409 1/1985 Japan ................................. 98/2.01

Primary Examiner—Harold Joyce
Attorney, Agent, or Firm—Cushman, Darby & Cushman

[57] ABSTRACT

An automatic demisting system primarily for aircraft windscreens in which a microprocessor is used to control heating to ensure that the internal surface of the windscreen is maintained above the dewpoint temperature of the adjacent air, but the windscreen is not wastefully heated when heating is unnecessary, for example when the windscreen is subject to kinetic heating.

8 Claims, 3 Drawing Figures

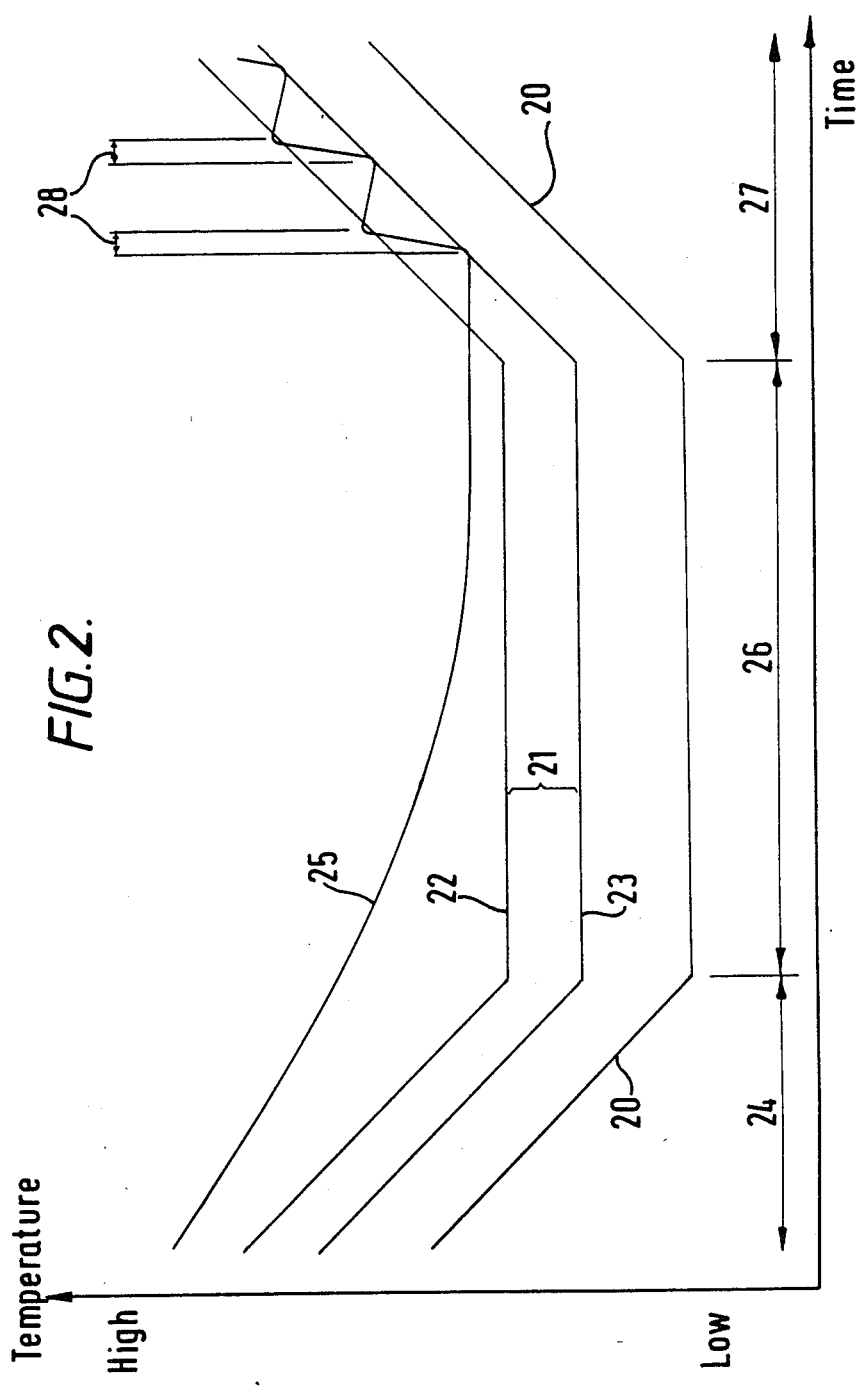

AUTOMATIC MIST PREVENTING SYSTEM FOR VEHICLE TRANSPARENCIES

This invention relates to mist preventing systems for vehicle transparencies. The invention is in this specification related to aircraft but it has application to the transparencies of other vehicles. For each of description, the well known terms 'demist' and 'windscreen' are used throughout this specification, the former denoting both demisting subsequent to mist formation and mist prevention, and the latter denoting all types of transparency requiring to be demisted.

Windscreens mist up because atmospheric air always contains water in vapour form; the maximum amount of water being dependent on the temperature of the air. So, for a given quantity of water, there will be a temperature during cooling at which all the vapour can no longer be supported. This temperature is termed the dewpoint; below this temperature free water will be condensed. From this, it is evident that if air is in contact with a solid, which is colder than the temperature at which all the water can be supported in vapour form (colder than the dewpoint), then water will be condensed onto the solid.

It can therefore be seen that the two most important factors in considering aircraft misting are temperatures and water vapour contents. In the atmosphere, both of these are relatively high at low altitude and low at high altitude. A further factor which influences the inside screen temperature is the thermal inertia of the screen, i.e. the time lag which occurs between external and internal screen temperature changes. This time lag means that during aircraft descent, the internal screen temperature remains cold while the cabin air is increasing in water content. The result is that the dewpoint may be raised above the internal screen temperature and misting occurs. In order to prevent this situation, demist systems are used to heat the screen such that the dewpoint does not exceed the internal screen temperature.

The demist systems in use at the present can be split into two basic types; those using hot air and those using electrical heating.

Hot air systems use engine bleed taken from high pressure compressors. This is readily available since the ducting and valves required are primarily built for the environmental system. At the windscreen the hot air is throttled in a slot nozzle, before passing over the inside surface to prevent dew formation. There is no automatic control on these systems.

The electrical demist systems incorporate heating elements within the screen and are powered from the engines via generators. Automatic regulation of the windscreen temperature is used here, however, no account is taken of the humidity. The windscreen would, therefore, be far in excess of the dewpoint temperature for most of the flight, if it was not for the pilot's manual 'system-off' facility.

Both systems are therefore highly dependent on the pilot to judge the likelihood of misting, according to flight and weather conditions.

Currently, an increasing number of constraints are being placed on aircraft windscreens, in particular due to new night-sight systems. It is therefore probable that in the future, internal heating elements will become unsuitable and demist systems will become entirely the hot-air type.

Naturally there are problems with current demist systems. In general, the effectiveness of an aircraft system can be assessed in two distinct areas; the ability of the system to perform its function and the quality of integration with other systems.

The function of a demist system is to keep the windscreen clear of mist during flight. All systems currently in use are capable of fulfilling this function assuming no failures.

In considering the quality of integration with other aircraft systems, the most important 'integration system' is the pilot. The pilot makes all decisions concerning the state of the demist system, and since no instrumental data is available these decisions are based solely on his judgement. This situation means that the demist is inevitably overused, causing excessive noise and hot air in the cabin. Consequently, radio communications are hindered, the pilot is uncomfortable, and fuel is wasted. Should the pilot underuse the system however, the windscreen will become misted, resulting in a loss of pilot vision and a considerable reduction in aircraft safety. Pilot responsibility is not only a weakness in the demist system, but the workload required also reduces his effectiveness on other systems. Thus an automatic system is most desirable. It is an object of the present invention to provide such a system.

According to one aspect of the present invention, an automatic demisting system for vehicle transparencies includes:

heating means for the transparency, control means for the heating means, means for deriving the dewpoint temperature of the air adjacent the transparency interior surface, means for deriving the temperature of the transparency interior surface, and computer means comprising;

means for starting a control band of transparency interior surface temperatures with upper and lower temperature levels, both levels being above said derived dewpoint temperature and related to it, means for comparing the temperature of the transparency interior surface with the upper and lower control band temperature levels, and means both for signalling said control means to cause said heating means to increase the temperature of the transparency when the temperature of the interior surface thereof decreases towards the lower temperature level and for signalling said control means to cause said heating means to decrease the temperature of the transparency when the temperature of the interior surface thereof increases towards the upper temperature level whereby the temperature of said interior surface is prevented from decreasing to the dewpoint temperature by selective control of the heating means. By this arrangement the internal surface of the transparency is maintained above the dewpoint temperature, but the transparency is not wastefully heated when heating is unnecessary, for example when the transparency is subject to kinetic heating.

The dewpoint and the internal transparency temperature deriving means may comprise a processor which, from inputs such as Mach Number (in an aircraft situation), ambient temperature, and pressure, and cabin temperature, will compute approximate values.

Alternatively, these temperatures can be derived more directly by the use of dewpoint and temperature sensors respectively located with an intake in the air adjacent the transparency and in the transparency itself.

Figure 1B:
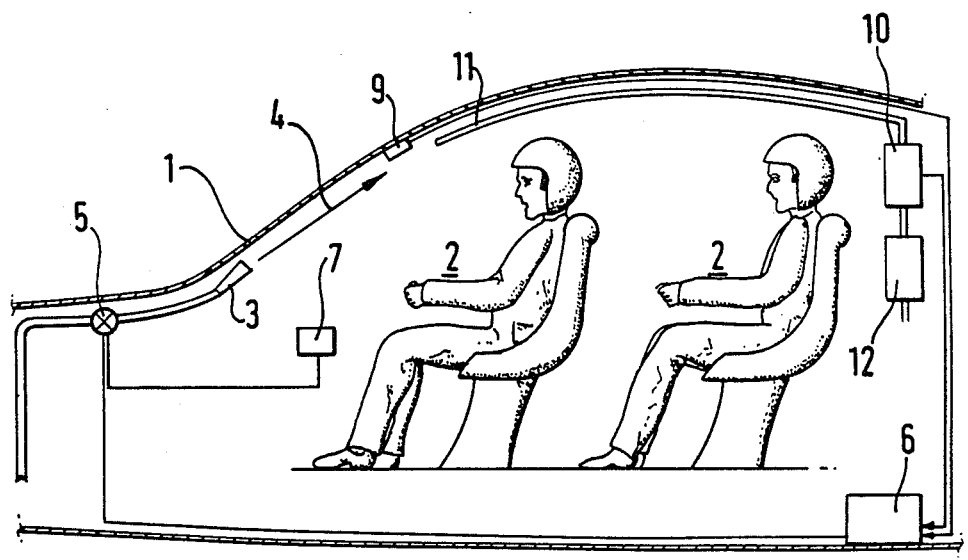

Some embodiments of a system suitable for use in aircraft are described by way of example, with reference to the accompanying drawings in which:

FIG. 1A is a diagrammatic view of an aircraft cockpit including one demisting system, FIG. 1B is a similar view to that of FIG. 1A including an alternative system, and FIG. 2 is a diagram of control parameters (temperature plotted against time) in respect of a typical aircraft mission.

In the Figures, an aircraft has a cockpit and a cockpit transparency in the form of a windscreen 1 through which crew members 2 can view the outside world. The windscreen 1 is provided with an outlet 3 at its base through which a sheet of hot air 4 is directed over its interior surface. The hotair is conveniently supplied from the aircraft's propulsion power plant (not shown) via a control valve 5. Alternatively the windscreen is electrically heated; in this case the control valve 5 is replaced by an electrical switch.

The valve 5, which is either ON or OFF, is controlled by a microprocessor 6 with a manual override shown at 7. FIGS. 1A and 1B illustrate alternative input arrangements to the microprocessor—naturally the inputs of the two Figures can be selectively combined to provide further input arrangements.

In all systems the dewpoint temperature of the air adjacent the internal surface of the windscreen must be derived as must the inside screen temperature. From these values, control signals for the valve 5 are obtained, by comparison in the microprocessor 6, with a predetermined control band of temperatures. This aspect is further discussed with reference to FIG. 2.

FIG. 1A illustrates a system in which the dewpoint and the internal surface temperatures are calculated to give approximate values. The calculations are performed by a part of the microprocessor 6A from inputs 8 already available within the aircraft from a general services data bus such as Mach Number (relevant to kinetic heating), ambient temperature, ambient pressure and cabin temperature and passed into the micrprocessor 6 for comparison with the control band and subsequently to provide a control signal for the valve 5. This method has the advantages of reliability and low production costs.

FIG. 1B illustrates a system in which the dewpoint and internal windscreen surface temperatures are determined by sensors. A temperature sensor 9 is positioned on the interior surface of the windscreen, or preferably embedded therein to avoid any air influence on the sensor, to give a highly accurate rendering of interior surface temperature to the microprocessor 6. A dewpoint temperature sensor 10 is located in any convenient position and is supplied with air extracted from adjacent the windscreen by a duct 11 and pump 12. Again these two inputs are compared with the control band in the microprocessor 6 and an output signal to the valve 5 produced.

There is currently a wide range of dewpoint temperature sensors available including variable capacitance and variable resistance types, which both use a porous material over or through which the air to be tested is drawn, and chilled mirror types which use a Peltier effect to cool a mirror thereby changing the reflective qualities thereof.

This system is more accurate than that described with reference to FIG. 1A and allows closer tolerances between the control band and the dewpoint temperature (see FIG. 2). The activation time of the demist system, that is to say the period during which the windscreen is actually being heated by the system, is less thereby reducing any tendency to excessive cabin temperature and noise. The main disadvantages are high production costs and the weight of the sensors.

FIG. 2 illustrates how the microprocessor 6 is programmed to operate during an aircraft mission. The vertical scale is Temperature whilst the horizontal scale is Time.

The dewpoint temperature variation with time is shown by curve 20; this is obtained from calculation as in FIG. 1A or from the sensor 10 as in FIG. 1B. A control band 21 is set from the curve 20, having an upper curve 22 arranged such that at any given time the valve 5 is closed at internal screen temperatures above the level of the upper curve, and having a lower curve 23 which is arranged such that at any given time the control valve 5 is opened as the internal screen temperature reaches or falls below that lower level.

The lower level 23 is so related to the dewpoint temperature level 20 that mist is not formed upon the windscreen, that is to say the lower level 23 is selected so that it is always at a chosen amount above the dewpoint level 20. In the typical operation, shown in FIG. 2, during the climb portion 24 of flight, the inside screen temperature 25 is above the upper level 22 of the control band 21, (due to residual heat and kinetic heating), during the subsequent cruise portion 26 of the flight, the temperature 25 is seen to be dropping, whilst in the final descent portion 27 of flight the temperature 25 belatedly (due to thermal lag in the windscreen material) drops to the lower level 23 of the control band. The valve 5 is then moved to the on position and heating of the windscreen is effected until the upper level 22 of the control band is reached. The valve is then moved to off and the process repeated.

Successive "demist-on" periods are indicated at 28.

In summary, the benefits from the automatic control of demist are that a minimum heating is required to prevent misting. Any hot air mass used is therefore reduced implying a saving in fuel. In order to quantify the available fuel saving, results of work on airconditioning fuel penalty have been used. These calculations suggest that even for the worst misting conditions i.e. in the high humidity of the tropics, the weight saving in fuel would be unlikely to offset the weight of additional sensors, (estimated fuel mass saving would probably not exceed 1 kg during any sortie). It is therefore unrealistic to justify automatic control of demist by the saving of fuel.

In the tropics, since misting is likely to occur, the pilot may use demist throughout a descent. This would be due to his inability to judge if and when windscreen heating is required, and therefore when heating is not required. The excessive noise and cabin temperature incurred by continued demist would be considerably decreased by automatic demist, (a reduction of up to 100% of demist-on time during a descent is possible. The lack of responsibility to control demist would reduce the pilot workload, and coupled with the decrease in discomfort would improve pilot effectiveness.

Finally, automatic control means that without system failures, the aircraft will never mist up. This reliability of clear vision increases the safety of the aircraft.

I claim:

1. An automatic demisting system for vehicle transparencies including:
   heating means for the transparency,
   control means for the heating means,
   means for deriving the dewpoint temperature of the air adjacent the transparency interior surface,
   means for deriving the temperature of the transparency interior surface, and computer means comprising;
   means for storing a control band of transparency interior surface temperatures with upper and lower temperature levels, both levels being above said derived dewpoint temperature and related to it,
   means for comparing the temperature of the transparency interior surface with the upper and lower control band temperature levels, and
   means both for signalling said control means to cause said heating means to increase the temperature of the transparency when the temperature of the interior surface thereof decreases towards the lower temperature level and for signalling said control means to cause said heating means to decrease the temperature of the transparency when the temperature of the interior surface thereof increases towards the upper temperature level whereby the temperature of said interior surface is prevented from decreasing to the dewpoint temperature by selective control of the heating means.

2. An automatic demisting system according to claim 1 wherein said heating means for the transparency comprises hot air outlet means and said control means comprises valving means.

3. An automatic demisting system according to claim 2 wherein said valving means is movable between an on position and an off position.

4. An automatic demisting system according to claim 1, wherein said means for deriving the dewpoint temperature comprises solid state signal processing means capable of processing at least input signals relating to the Mach number at which the vehicle is travelling, ambient temperature, ambient pressure and vehicle cabin temperature.

5. An automatic demisting system according to claim 1, wherein said means for deriving the dewpoint temperature comprises a dewpoint sensor.

6. An automatic demisting system according to claim 5 wherein said dewpoint sensor is mounted remote from the transparency and is fed with air by extraction inlet means located adjacent the transparency.

7. An automatic demisting system according to claim 1 wherein said means for deriving the temperature of the interior surface of the transparency comprises solid state signal processing means capable of processing at least imput signals relating to the Mach Number at which the vehicle is travelling, ambient temperature, ambient pressure, and vehicle cabin temperature.

8. An automatic demisting system according to claim 1 wherein said means for deriving the temperature of the interior surface of the transparency comprises a temperature sensor attached to or embedded within the transparency.

* * * * *